(12) United States Patent
Hacker (10) Patent No.: US 9,454,398 B2
(45) Date of Patent: Sep. 27, 2016

(54) ENHANCED DATA CONTAINER WITH EXTENSIBLE CHARACTERISTICS AND A SYSTEM AND METHOD OF PROCESSING AND COMMUNICATION OF SAME

(71) Applicant: Andrew John Hacker, Enola, PA (US)

(72) Inventor: Andrew John Hacker, Enola, PA (US)

( * ) Notice: Subject to any disclaimer, the term of this patent is extended or adjusted under 35 U.S.C. 154(b) by 217 days.

(21) Appl. No.: 13/889,348

(22) Filed: May 8, 2013

(65) Prior Publication Data
US 2014/0337388 A1    Nov. 13, 2014

(51) Int. Cl.
*G06F 17/30* (2006.01)
*G06F 9/46* (2006.01)

(52) U.S. Cl.
CPC ...................................... *G06F 9/46* (2013.01)

(58) Field of Classification Search
None
See application file for complete search history.

(56) References Cited

U.S. PATENT DOCUMENTS

| | | | |
|---|---|---|---|
| 6,928,526 B1* | 8/2005 | Zhu et al. ...................... 711/154 |
| 7,065,619 B1* | 6/2006 | Zhu et al. ...................... 711/162 |
| 7,466,659 B1* | 12/2008 | Kazar et al. .................. 370/252 |
| 7,539,777 B1* | 5/2009 | Aitken .................... H04L 69/16 370/466 |
| 7,657,573 B1* | 2/2010 | Hancsarik et al. ............ 707/809 |
| 8,325,821 B1* | 12/2012 | Kizhepat ........ H04N 21/234345 375/240.26 |
| 2007/0002900 A1* | 1/2007 | Karkas et al. ................. 370/473 |
| 2007/0030848 A1* | 2/2007 | Miyata ................ H04L 12/4633 370/389 |
| 2007/0280438 A1* | 12/2007 | Pritchett ................. H04L 12/66 379/88.13 |
| 2009/0300147 A1* | 12/2009 | Beers et al. ................... 709/220 |
| 2011/0040967 A1* | 2/2011 | Waller et al. ................. 713/161 |
| 2012/0128058 A1* | 5/2012 | Bakharov et al. ........ 375/240.01 |
| 2012/0159098 A1* | 6/2012 | Cheung et al. ............... 711/162 |

* cited by examiner

*Primary Examiner* — Kenny Lin
(74) *Attorney, Agent, or Firm* — MH2 Technology Law Group, LLP (57) ABSTRACT

A variety of tools and techniques are disclosed for creating and managing an enhanced data container. The enhanced data container is comprised of extensible characteristics that when processed interact with a variety of computing devices and computing device components. The enhanced data container is communicated to a variety of computing devices in varying ways and processing of the enhanced data container is coupled with additional systems to manage the enhanced data container by as controlling the number of instances in a system, assigning virtual or real monetary value to instances, assign unique identifiers to instances, and allowing the enhanced data container to be modified by inputs and rendered or transmitted to outputs of computing devices. These technologies bring additional functionality and levels of interaction to data in consumer and business applications.

19 Claims, 7 Drawing Sheets

ENHANCED DATA CONTAINER WITH EXTENSIBLE CHARACTERISTICS AND A SYSTEM AND METHOD OF PROCESSING AND COMMUNICATION OF SAME

CROSS-REFERENCE TO RELATED APPLICATIONS

This application claims the benefit of PPA Ser. No. 61/688,093

FEDERALLY SPONSORED RESEARCH OR DEVELOPMENT

Not Applicable

SEQUENCE LISTING OR PROGRAM

Not Applicable

BACKGROUND OF THE INVENTION

1. Field of Invention

The present invention relates to data use and transmission in a networked environment, more specifically to an enhanced data container with extensible characteristics and a system and method for displaying, processing and communication of same.

2. Prior Art

The current data usage paradigm in a computing environment comprises applications having all of the intelligence. Applications that are executed either on a standalone computing device such as a personal computer or mobile device, or an Internet resident computing service, such as a website, or cloud service, create, store and manipulate simple or unintelligent data such as structured, and unstructured data, electronic files, database elements, content such as photos, word processing documents, files, or communications such as email, notifications, chat or SMS messages. Attempts to provide additional information to raw data include adding simple and static information elements called metadata or metatags such as author, created date, type of data such as music, video, photo, category or classification terms, or more recently GPS coordinates. Metadata is a set of static data that doesn't bring any functionality to the data itself. Any operation on the data must be programmed into the application accessing the data.

Furthermore, mobile computing has led to the growth of miniature applications or applets and another trend is that many Internet websites and cloud services provide additional functionality to their own data formats, leading to vast numbers of complex, competing and non-interoperable systems, services, applications, and data formats all managing similar types of data. Furthermore, data in prior art systems is typically static with no inherent functionality as part of the data envelope or container requiring extensive application code that is external to the data to perform any functions.

OBJECTS AND ADVANTAGES

In order to simplify complexity while increasing usefulness of data and content, this invention creates a self-contained instance of functional intelligent data that brings application intelligence and standalone functionality directly to data and content offering multiple advantages over prior art without limitation including:

a) Bringing functionality closer to the data resulting in more granular control and ability to manipulate the data.
b) Allowing for improvements in or changes to functionality without the complexity of redesigning the underlying application or system.
c) Greater protection, tracking, and integrity of data
d) More interactivity of or with the data
e) Greater interoperability with multiple systems and applications
f) Ability to have finer control over creation, storage, copying, modification, and deletion of data
g) Greater security of data
h) Creating inherent value in the data itself

SUMMARY

The present invention is an enhanced data container and a means of communication and processing said enhanced data container that provides extensible and functional data and interaction in a computing environment.

DRAWINGS

Figures

DETAILED DESCRIPTION

Preferred Embodiment

Figure 1:
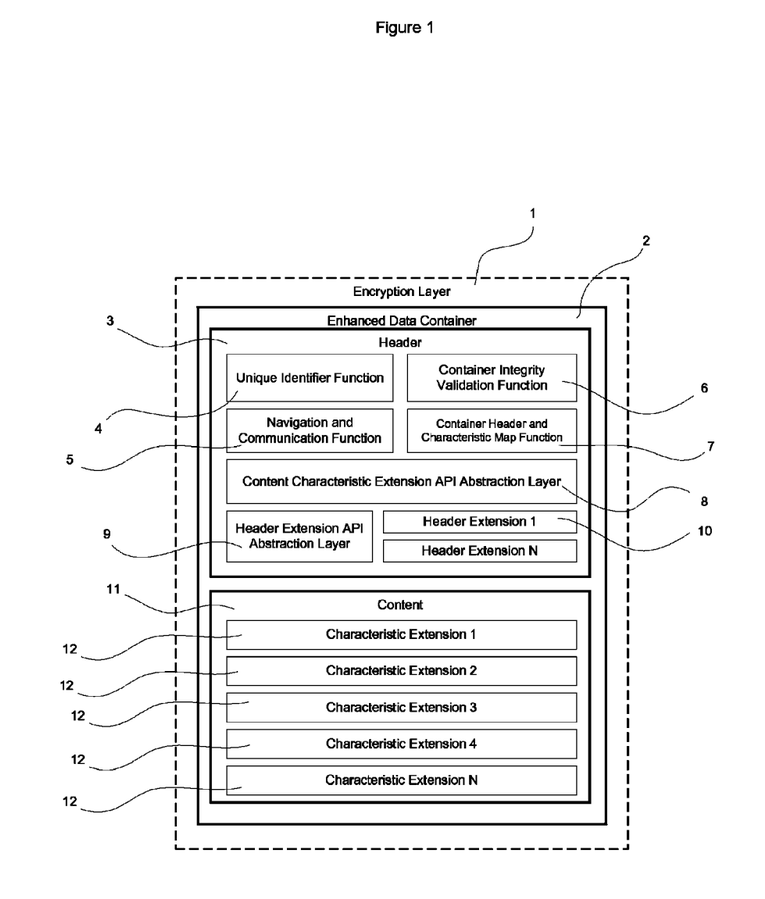
FIG. 1 is a functional view of the enhanced data container.

Referring now to the invention in more detail, in FIG. 1 there is shown a functional view of the enhanced data container 2 and its functional components. Functional components can be data stores, software functions, or a combination of both. Enhanced data container 2 is encapsulated with a suitable encryption layer or mechanism with which the encryption strength and mechanism can be varied from 1 and contains two subsections, header section 3 and content section 11. Header subsection 3 contains several functional components including a unique identifier function 4, navigation and communication function 5, container integrity validation function 6, container header and characteristic map function 7, content characteristic extension application programming interface (API) abstraction layer 8, header extension API abstraction layer, and one up to N number (N being a number higher than 1 bound by the data size limit of the header subsection) of header extensions 10. Content subsection 11 contains one up to N number (N being a number higher than 1 bound by the data size limit of the content subsection) of characteristic extensions 12. All functional components in the header subsection can optionally be achieved as content extensible characteristic extensions 12.

In more detail, still referring to the invention of FIG. 1, encryption layer 1 comprises an encryption mechanism that ensures the entire contents of enhanced data container 2 are fully encrypted within the secure envelop of encrypted layer 1 and cannot be decoded or read without the proper decryption method. Enhanced data container 2 contains information such as raw data values of any kind, code, applications, application programming interfaces, functions, programming objects, values, variables, arrays, and content. All functional components within enhanced data container 2 interact with functions in the container processor 13 illustrated in FIG. 2 to either execute a function and/or store a data value either in enhanced data container 2 or within the data store which is part of the additional elements 26 of the computing device 25 shown in FIG. 4 via container processor 13 shown in FIG. 2. Header subsection 3 contains all of the operational functionality and related data values of the enhanced data container 2. The unique identifier function 4 is responsible for creating and validating the unique identity of the specific enhanced data container 2 in which it is contained using either a centralized or distributed unique identifier data store. The unique identifier function 4 can utilize a flat or hierarchical identifier function to produce unique instances of certain types within nested recursive hierarchies. The container integrity validation function 6 that in conjunction with encryption layer 1 will validate that the data in enhanced data container 2 has not been modified or tampered with and is the same as the originally created enhanced data container 2 unless such modification is authorized by a valid container processor 13. The navigation and communication function 5 is responsible for providing functionality relevant to the transmitting and receiving of and how enhanced data container 2 moves from computing device 25 to computing device 27 illustrated in FIG. 3 via container processor 13. The container header and characteristic map function contains information that describes relevant information about header extensions 10 contained in header subsection 3 and characteristic extensions 12 contained in content subsection 11 such as identification, type of attribute, and offset value of the information within the relevant subsection 3, 11. The content characteristic extension API Abstraction layer 8 provides information about the application layer functions contained in the associated characteristic extensions 12 such as structure of the extension and valid parameters and values. Header extension API abstraction layer 9 provides information about the application layer functions contained in associated header extensions 10 such as structure of the extension and valid parameters and values. Header extension 10 and characteristic extension 12 contain the actual relevant extension data. Header extensions 10 and characteristic extensions 12 can be hierarchical and recursive; that is, they can contain characteristics of other characteristics or can contain other enhanced data containers 2. The functionality of any subcomponent of the enhanced data container can be augmented, eliminated, combined, shared or swapped with any other subcomponent as required to provide proper functionality of container processor 13 and enhanced data container 2.

The construction detail of the invention as shown in FIG. 1 is as follows. Enhanced data container 2 and all of its components 1, 2, 3, 4, 5, 6, 7, 8, 9, 10, 11, and 12 can be created using any communication technology, protocol, programming language, data type and or content type with sufficient capabilities to produce the required functionality.

Figure 2:
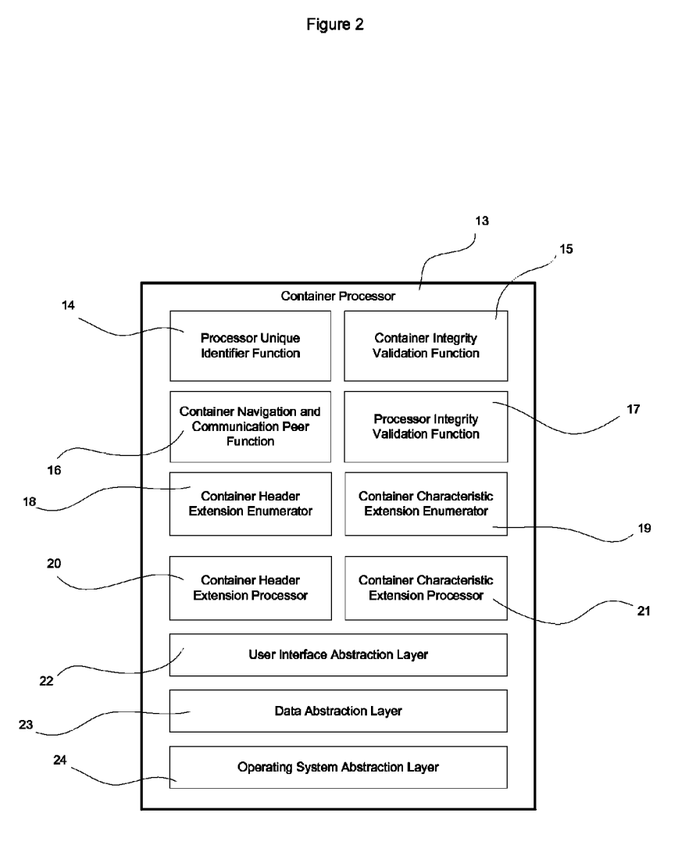
FIG. 2 is a functional view of the enhanced data container processor.

Referring now to the invention in more detail, in FIG. 2 there is shown a functional view of container processor 13 and its functional components. Container processor 13 contains processor unique identifier function 14, container integrity validation function 15, container navigation and communication peer function 16, processor integrity validation function 17, container header extension enumerator 18, container characteristic extension enumerator 19, container header extension processor 20, container characteristic extension processor 21, user interface abstraction layer 22, data abstraction layer 23, and operating system abstraction layer 24.

In more detail, still referring to the invention of FIG. 2, container processor 13 contains processor unique identifier function 14 that is responsible for creating and validating the unique identity of the specific container processor 13 in which it is contained using either a centralized or distributed unique identifier data store. The processor unique identifier function 14 can utilize a flat or hierarchical identifier function to produce unique instances of certain types within nested recursive hierarchies. Container integrity validation function 15 in conjunction with enhanced data container encryption layer 1 and container integrity validation function 15 shown in FIG. 1 validates that the data in enhanced data container 2 being processed by container processor 13 has not been modified or tampered with and is the same as the originally created enhanced data container 2 unless such modification is authorized by a valid container processor 13 and new values for validation functions would be issued. The container navigation and communication peer function 5 is responsible for providing functionality relevant to transmitting and receiving of and moving enhanced data container 2 from computing device 25 to computing device 27 illustrated in FIG. 3. Processor integrity validation function 17 validates that the container processor entity as a whole including the program structure and data that comprises the container processor 13 has not been modified or tampered with and is the same as the originally created container processor 13 unless such modification is authorized by a valid container processor 13 software or data update and new values for validation functions would be issued. The container header extension enumerator 18 processes the container header and characteristic map function 7 and reads in header extensions 10 from enhanced data container 2 for use by container processor 13. The container characteristic extension enumerator 19 processes container header and characteristic map function 7 and reads in characteristic extensions 12 from enhanced data container 2 for use by container processor 13. The container header extension processor 20 incorporates or executes the instructions contained in header extensions 10 and container characteristic extension processor 21 incorporates or executes the instructions contained in the characteristic extensions 12. Both extension processors 20 and 21 contain all the relevant data, code, application or application component, application programming interface, variables, and or content to effectively process the relative header extensions 10 and characteristic extensions 12 contained in enhanced data container 2. The specific information that is required in the extension processors 20 and 21 to process the relative header extensions 10 and characteristic extensions 12 is extensible can be downloaded on demand by an external source as required. The extension processors 20 and 21 interface with User Interface Abstraction Layer 22, Data Abstraction Layer 23, and Operating System Abstraction Layer 24 to produce the results as encoded in header and characteristic extensions 10 and 12. All subcomponents within container processor 13 interact with all other components as required and container processor 13 contains instructions that manage all of the subcomponents and overall operation of container processor 13 as required. User interface abstraction layer 22 is responsible for interfacing with the computing device specific user input and output components including but not limited to display, devices such as keyboard, mouse, touch screen, voice activated components, audio output, software or hardware component or process, and any other appropriate user interface component supported by computing device 25. Data abstraction layer 23 is responsible for interfacing with the data storage and retrieval components of computing device 25 including but not limited to memory, file systems and or database functions or any other data storage and retrieval component supported by computing device 25. Operating system abstraction layer 24 is responsible for interfacing with any operating system component including computing device specific functions such as GPS, motion sensors, vibration output and those included in user interface abstraction layer 22 and data abstraction layer 24 if it is more appropriate to include those in this component, and any other operating system component supported by computing device 25. The functionality of any subcomponent of container processor 13 can be augmented, combined, shared or swapped with any other subcomponent as required to provide proper functionality of container processor 13 and enhanced data container 2.

The construction detail of the invention as shown in FIG. 2 is as follows. Container processor 13 and all of its components 14, 15, 16, 17, 18, 19, 20, 21, 22, 23, and 24 can be created using any communication technology, protocol, and or programming language with sufficient capabilities to produce the required functionality.

Figure 3:
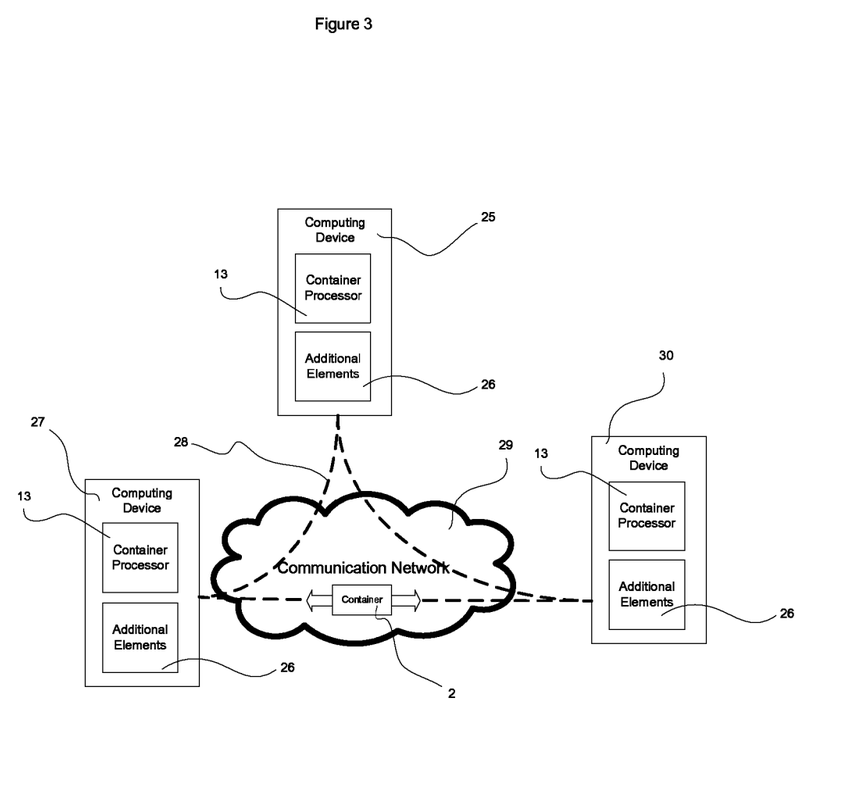
FIG. 3 is a view of the communication of the enhanced data container over a communications network between computing devices

Referring now to the invention in more detail, in FIG. 3 there is shown a functional view of the communication of enhanced data container 2 between computing devices 25, 27, and 30. Computing device 25, 27, and 30 contain container processor 13 and additional elements 26 relevant to the computing device 25, 27, and 30. Enhanced data container 2 is transmitted from transmitting computing device 27 to a second computing device 30 via secure or unsecured connection 28 over communication network 29.

In more detail, still referring to the invention of FIG. 3 container processor 13 is present on a computing device 25 that contains additional elements 26 relevant to the specific computing device 25 that are known or unknown computer hardware and software components such as operating system, storage, memory, user interface components, other software services such as database servers, web servers, or additional applications or services providing known or unknown functionality. Computing 25, 27, 30 device can be any device capable of computation. The secure or unsecured connection 28 between two or more computing devices 25, 27, and 30 is created using a secure or unsecured connection 28 over any suitable communication network 29. Communication of enhanced data container 2 can be of any communication type, such as one to one communication, one to many communication, or many to many communication. Enhanced data container 2 is transmitted from the transmitting computing device 27 via container processor 13 over secure or unsecured connection 28 to a second or third computing device 27 and 30 which is established over communication network 29. Enhanced data container 2 is received by receiving computing device 30 and processed by receiving computing device's 30 container processor 13.

The container processor 13 interacts with additional elements 26 of the respective computing devices A 25, B 27, and C 30 as required.

The construction detail of the invention as shown in FIG. 3 is as follows. The communication of enhanced data container 2 between computing devices 25, 27, and 30 with secure connection 28 over a communication network 29, can be created using any communication technology, protocol, and or programming language with sufficient capabilities to produce the required functionality.

Figure 4:
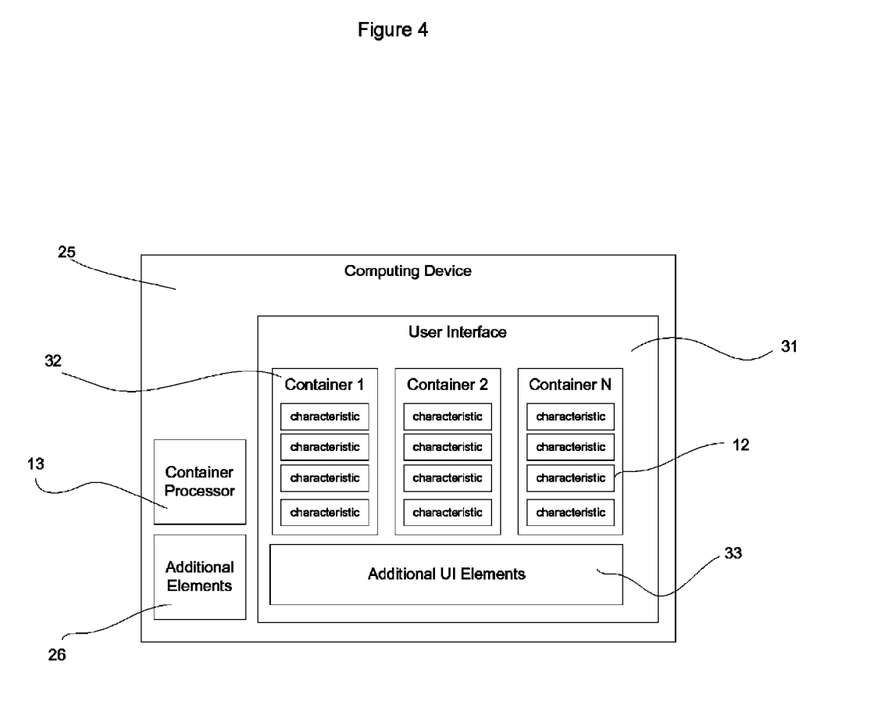
FIG. 4 is a functional view of the interaction of the enhanced data container with a computing device.

Referring now to the invention in more detail, in FIG. 4 there is shown a functional view of the user interface 31 and display of a processed and rendered manifestation of enhanced data container 32 on user interface 31 of computing device 25. The computing device contains container processor 13 and additional elements 26 relevant to computing device 25 along with additional user interface elements 33 created by container processor 13 or computing device 25. The enhanced data container rendering 32 contains elements dictated by the characteristic extensions 12.

In more detail, still referring to the invention of FIG. 4 the user interface 31 provides interaction to either a user or a another process or program within the computing device. User interface 31 comprises any input or output or combination input and output function provided by computing device 25.

Container processor 13 and any required additional functional elements 26 provided by computing device 25 provide the required information to user interface 31 to create the rendering of enhanced data container 2 in the rendered manifestation of enhanced data container 32 on specified user interface 31. The rendered enhanced data container 32 is rendered according to characteristics 12 present in enhanced data container 2. Additional user interface elements 33 may be created by container processor 13 or computing device 25 as required for appropriate functioning of user interface 31. User interface 31 is optional and interaction with container processor 13 and enhanced data container 2 can be achieved programmatically from other functional components or processes from within computing device 25 or a subcomponent of container processor 13.

The construction detail of the invention as shown in FIG. 4 is as follows. The rendering of enhanced data container 32 on user interface 31 with characteristics 12 and all functional components present in FIG. 4, can be created using any communication technology, protocol, and or programming language with sufficient capabilities to produce the required functionality.

DESCRIPTION AND OPERATION OF ALTERNATIVE EMBODIMENTS

Figure 5:
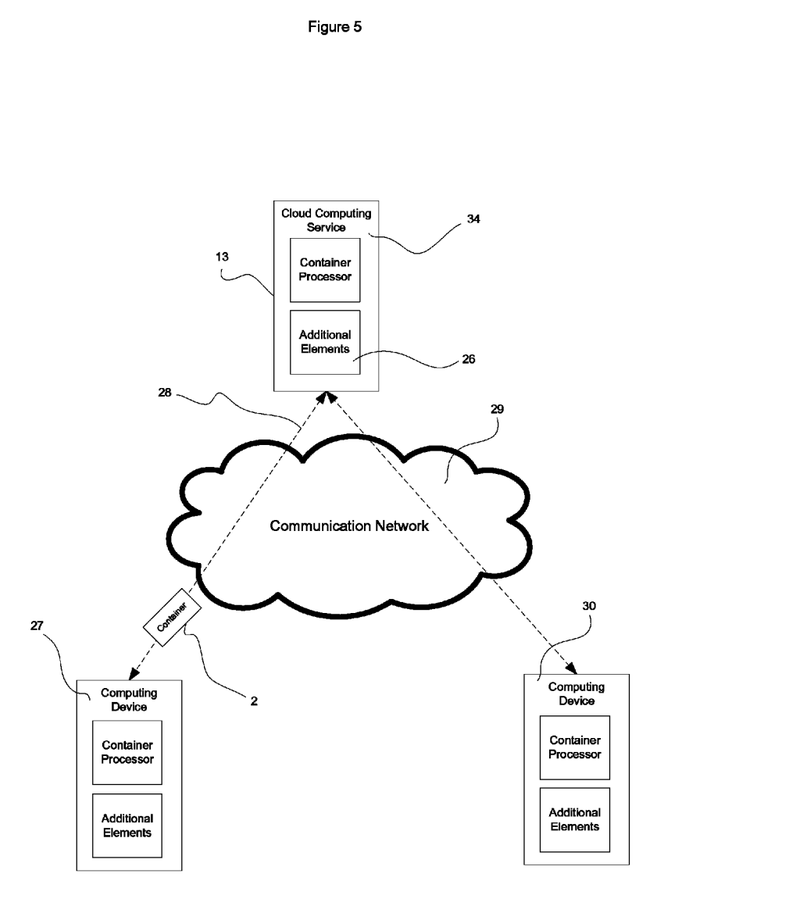
FIG. 5 is a view of the communication of the enhanced data container over a communications network between computing devices in a cloud computing model

Showing an additional embodiment in FIG. 5, the enhanced data container 2 is transmitted over secure or unsecured connection 28 over communication network 29 between computing device 27 and cloud computing service 34 that comprises container processor 13 and additional elements 26.

Figure 6:
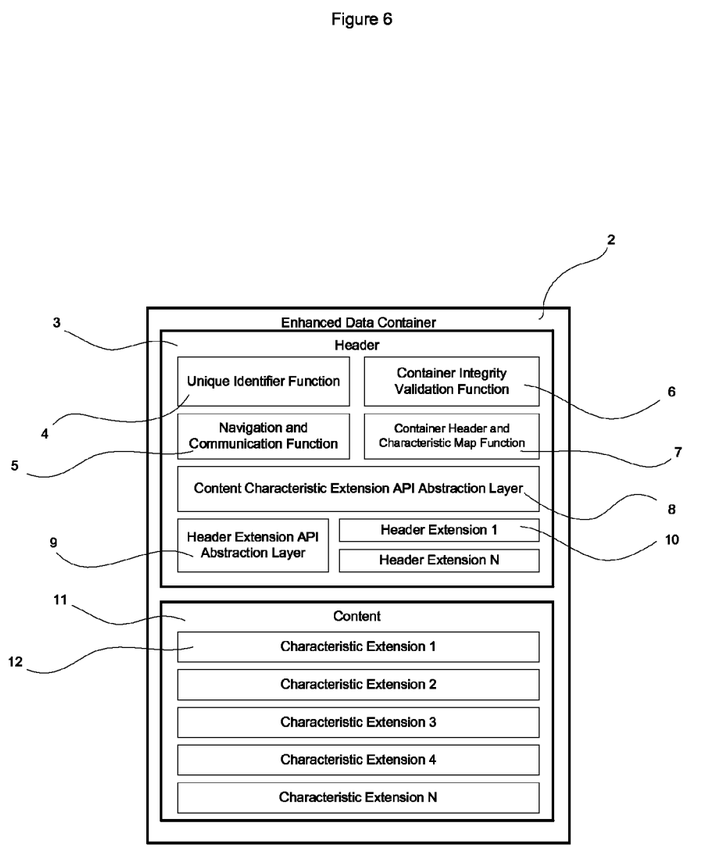
FIG. 6 is a view of the enhanced data container without encryption.

Showing an additional embodiment in FIG. 6, the enhanced data container 2 does not utilize encryption layer 1.

Figure 7:
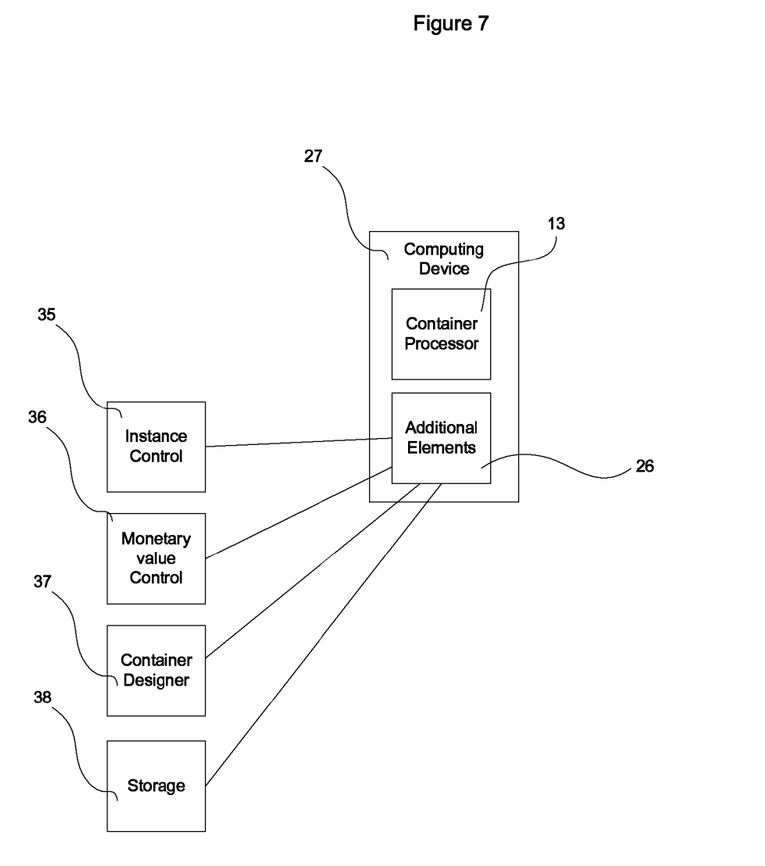
FIG. 7 is a view of the enhanced data container processor in a computing device connected to a system that controls scarcity and abundance of instances of enhanced data container and a system that assigns monetary value to instances of enhanced data container and a system that designs the enhanced data container elements

Showing an additional embodiment in FIG. 7, the enhanced data container processor 13 in computing device 27 connects additional elements 26 to systems 35, 36, 37, and 38 which can be internal or external to computing device 25. Instance control 35 controls the number of instances of enhanced data container 2 that exist on any computing device 27 or on any communication network 29. Monetary value control 36 assigns monetary or other value to a particular instance of enhanced data container 2, Container designer 37 is used to create the structure and function of the enhanced data container 2. Storage means and system 38 is a physical or virtual storage apparatus or mechanism or database system to store enhanced data container 2.

CONCLUSION, RAMIFICATIONS, AND SCOPE (SUB)

The advantages of the present invention include, without limitation, the ability to create interesting and unique combinations and or characteristics of data, applications, content, and computer device interactions to create value. Further advantages include, without limitation, the ability to create abundance or scarcity of certain combinations or characteristics and the ability to adjust the relative value thereof. Further advantages include, without limitation, the ability to create hierarchical classifications of combinations and or characteristics and to validate the integrity of the data, contents, and source of an individual instance of the invention.

In broad embodiment, the present invention is an enhanced data container and the system and method of processing and communication of the enhanced data container in a computing environment.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A system for creating and processing an enhanced data container with a computing device, the system comprising:
   a. an enhanced data container, the enhanced data container having at least a first and second subsection wherein
      i. the first subsection comprises an extensible header section having at least one function component, and
      ii. the second subsection comprises a mutable content section having at least one data component;
      iii. where said at least one function component in said first subsection includes the capability of altering said enhanced data container; and
   b. a container processor, the container processor adapted to:
      i. receive the enhanced data container, and
      ii. process the at least one function component of said enhanced data container.

2. The system of claim 1, wherein said container processor renders said at least one said data component on an output of said computing device; said rendering is based on program logic contained in said extensible header section.

3. The system of claim 2, wherein the output of said computing device is a display.

4. The system of claim 1, wherein said enhanced data container is modified by said container processor based on input from said computing device.

5. The system of claim 4, wherein said input is a user input.

6. The system of claim 1, wherein said container processor allows said enhanced data container to interact with an at least one additional element of said computing device.

7. The system of claim 6, wherein the at least one additional element said computing device is a storage medium.

8. The system of claim 7, wherein the storage medium is either volatile or non-volatile memory.

9. The system of claim 1, wherein said enhanced data container is secured with an encryption protocol.

10. The system of claim 1, wherein said enhanced data container is communicated using one or more peer to peer communication protocols.

11. The system of claim 1, wherein said enhanced data container is communicated from a cloud computing service to said computing device.

12. The system of claim 1, wherein the said enhanced data container comprises at least one unique identifier.

13. The system of claim 1, wherein a portion of the extensible header section tracks instances of said enhanced data container.

14. The system of claim 1, wherein the enhanced data container controls the number of instances of said enhanced data container that exist in the computing environment;
   wherein said computing environment may be a single device or a network of more than 1 devices.

15. The system of claim 1, wherein the processing of said enhanced data container comprises program logic to configure the characteristics and structure of said enhanced data container.

16. The system of claim 1, wherein the processing of said enhanced data container comprises program logic to configure the characteristics and structure of said enhanced data container.

17. The system of claim 1, wherein, based on program logic in said extensible header section, said processing comprises:
   a. combining multiple said enhanced data containers;
   b. exchanging characteristics of said enhanced data containers; and
   c. modifying characteristics and structure of said enhanced data containers.

18. The system of claim 1, wherein the extensible header section contains at least one of a unique identifier function, a navigation function, a container integrity validation function, a processor integrity function, a container characteristic extension enumerator, a container characteristic extension processor, a container header extension enumerator, and a container extension header processor.

19. A method for creating and processing an enhanced data container with a computing device, the method comprising:
   a. receiving the enhanced data container, the enhanced data container having at least a first and second subsection where
      i. the first subsection comprises an extensible header section having at least one function component, and
      ii. the second subsection comprises a mutable content section having at least one data component;
      iii. where said at least one function component in said first subsection includes the capability of altering said enhanced data container; and
   b. processing said enhanced data container based on the at least one function component.

* * * * *